United States Patent
Faigle (10) Patent No.: US 7,178,027 B2
(45) Date of Patent: Feb. 13, 2007

(54) SYSTEM AND METHOD FOR SECURELY COPYING A CRYPTOGRAPHIC KEY

(75) Inventor: Christopher T. Faigle, Richmond, VA (US)

(73) Assignee: Capital One-Financial Corp., Falls Church, VA (US)

(*) Notice: Subject to any disclaimer, the term of this patent is extended or adjusted under 35 U.S.C. 154(b) by 729 days.

(21) Appl. No.: 09/823,708

(22) Filed: Mar. 30, 2001

(65) Prior Publication Data

US 2002/0144117 A1 Oct. 3, 2002

(51) Int. Cl.
- H04L 9/32 (2006.01)
- H04K 1/00 (2006.01)
- H04M 1/66 (2006.01)

(52) U.S. Cl. ............ 713/169; 713/168; 380/247; 705/67; 455/411

(58) Field of Classification Search ........ 713/168–169; 380/247–250, 258; 705/67; 455/410–411
See application file for complete search history.

(56) References Cited

U.S. PATENT DOCUMENTS

| | | | | |
|---|---|---|---|---|
| 5,237,612 A | * | 8/1993 | Raith | 380/247 |
| 5,594,795 A | * | 1/1997 | Dent et al. | 380/247 |
| 5,991,407 A | * | 11/1999 | Murto | 380/248 |
| 6,065,120 A | * | 5/2000 | Laursen et al. | 726/5 |
| 6,198,823 B1 | * | 3/2001 | Mills | 380/247 |
| 6,225,888 B1 | * | 5/2001 | Juopperi | 340/5.8 |
| 6,341,220 B1 | * | 1/2002 | Hurme | 455/410 |
| 6,427,073 B1 | * | 7/2002 | Kortesalmi et al. | 455/414.1 |
| 6,704,789 B1 | * | 3/2004 | Ala-Laurila et al. | 709/230 |
| 2003/0191721 A1 | * | 10/2003 | Fiammante | 705/65 |

OTHER PUBLICATIONS

Bruce Schneier, Applied Cryptography, 1996, John Wiley and Sons, Inc., Second edition, pp. 574-577.*
Jean-Louis Carrara and Leo e. Legaspi, SIM Cards: At the heart of Digital Wireless Security, 2000.*

* cited by examiner

Primary Examiner—Emmanuel L. Moise
Assistant Examiner—Minh Dieu Nguyen
(74) Attorney, Agent, or Firm—Baker & McKenzie LLP (57) ABSTRACT

A system and method are provided in which a cryptographic key stored in a secure token such as a smart card can be copied to another smart card with high security and assurance with no intermediary being able to see what is being transferred. According to the invention, a host assisting in the transfer and a source smart card mutually authenticate themselves with each other. The host and a destination smart card also mutually authenticate themselves with each other. Then, the source card authenticates the destination card to ensure that the destination card is permitted to receive the cryptographic key of the source card. The source card then sends the cryptographic key to the destination card in a secure manner.

8 Claims, 7 Drawing Sheets

SYSTEM AND METHOD FOR SECURELY COPYING A CRYPTOGRAPHIC KEY

FIELD OF THE INVENTION

The present invention relates to cryptographic systems, and in particular to a system for securely copying a cryptographic key stored in a portable smart device such as a smart card.

BACKGROUND OF THE INVENTION

The development and proliferation of sophisticated computer technology and distributed data processing systems have led to a rapid increase in the transfer of information in digital form. Transmission of this information over unsecured or unprotected communication channels risks exposing the transmitted information to electronic eavesdropping or alteration. Cryptographic communications systems preserve the privacy of these transmissions by preventing the monitoring of messages transmitted over an insecure channel by unauthorized parties. Cryptographic communications systems also ensure the integrity of these transmissions by preventing the alteration by unauthorized parties of information in messages transmitted over an insecure channel. The cryptographic communications systems can further ensure the integrity and authenticity of the transmission by providing for recognizable, unforgeable and document-dependent digitized signatures that can prevent denial by the sender of his own message.

Two basic classes of cryptographic algorithms are employed today: symmetric key algorithms and asymmetric key algorithms.

Symmetric key algorithms use an identical key for both encrypting by the sender of a message and decrypting by the receiver of the message. Symmetric key cryptographic systems are built on the mutual trust of the two parties sharing the same key to use the cryptographic system to protect against distrusted third parties.

The second class of cryptographic algorithms, asymmetric key algorithms, uses two different but mathematically related keys for encrypting and decrypting. One key is arbitrarily termed a public key and the other a private key. A message encrypted with a public key is decrypted with a private key. Conversely, a message encrypted with the private key is decrypted with the public key. Although the keys of the pair are related, it is computationally infeasible to derive one key from knowledge of the other key.

Figure 1:
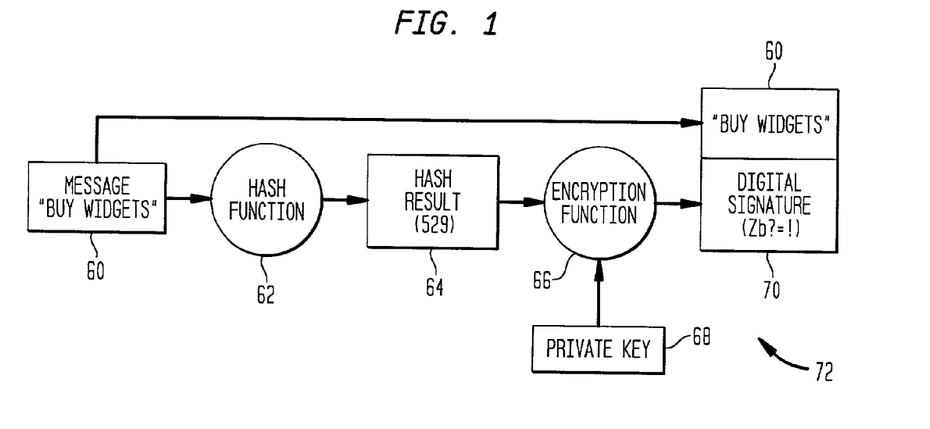
FIG. 1 is a flow diagram illustrating a process of digitally signing a document.

Digital signatures utilize the asymmetric cryptographic system. FIG. 1 illustrates the process of digitally signing a document containing a message "buy widgets" 60. A hash function 62 hashes the message "buy widgets" to arrive at a hash result 64 of "529" for that message. The hash function 62 is an algorithm which creates a digital representation or "fingerprint" in the form of a hash result that is substantially unique to the message. The hash result 64 is then encrypted using an encryption function 66 with a signer's private key 68. The resulting digital signature 70 is thus unique to both the message 60 and the private key 68 used to create it. The digital signature (a digitally signed hash result of the message) is then attached to its message 60 to create a digitally signed message 72.

Figure 2:
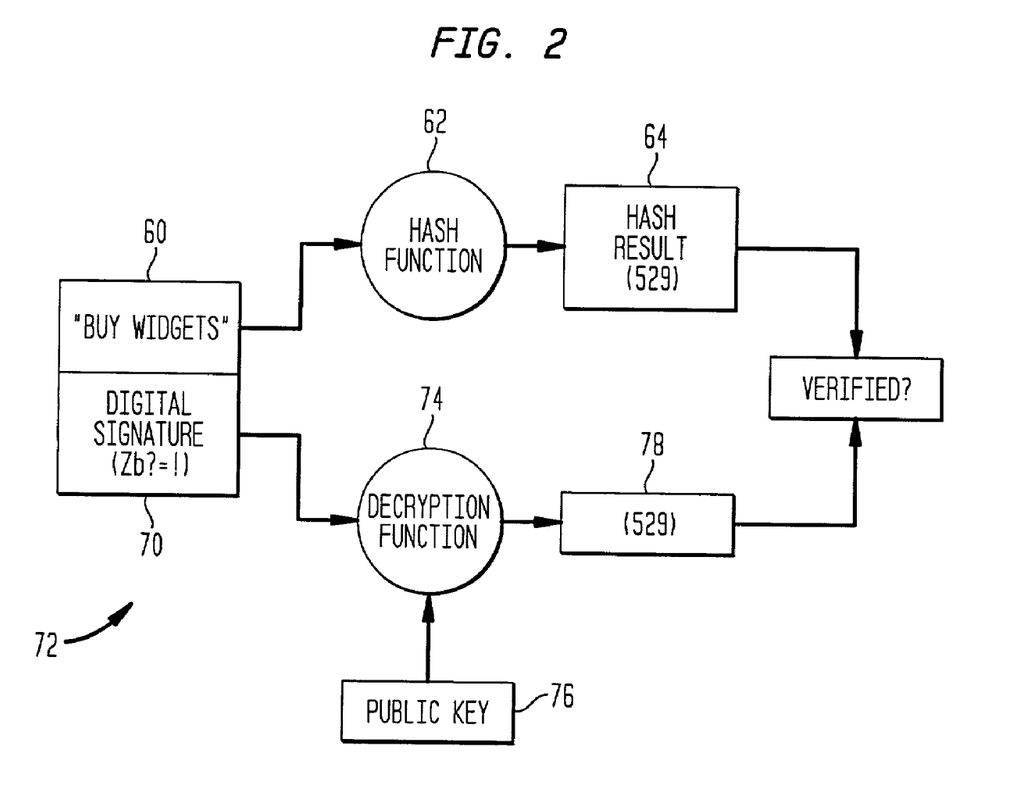
FIG. 2 is flow diagram illustrating a process of verifying a digitally signed document.

Referring to FIG. 2, to verify the digitally signed message 72, the message portion 60 is hashed by the same hashing function 62 that was used to create the digital signature 70. The digital signature portion 70 is decrypted using a decryption function 74 with a public key 76 corresponding to the private key 68. The digitally signed message 72 is verified if the hash result 64 from the message portion 60 matches the decrypted value 78 from the digital signature portion 70.

The processes used for digital signatures have undergone thorough technological review for over a decade. Digital signatures have been accepted in several national and international standards developed in cooperation with and accepted by many corporations, banks, and government agencies. The likelihood of malfunction or a security problem in a digital signature system designed and implemented as prescribed in the industry standards is extremely remote, and is far less than the risk of undetected forgery or alteration on paper or of using other less secure electronic signature techniques.

One disadvantage of a digital signature system, however, is that a public and private key pair has no intrinsic association with any person; it is simply a pair of numbers. Some convincing strategy is necessary to reliably associate a particular person or entity to the key pair.

That association can be done using one or more trusted third parties who are referred to as a certification authority. To associate a key pair with a prospective signer known as a subscriber, a certification authority issues a certificate, an electronic record that lists a public key of the subscriber, and confirms that the subscriber identified in the certificate holds the corresponding private key. To assure both message and identity authenticity of the certificate, the certification authority digitally signs it with its own private key. The issuing certification authority's digital signature on the certificate can be verified by using the public key of the certification authority listed in another certificate by another certificate authority (which may but need not be on a higher level in a hierarchy), and that other certificate can in turn be authenticated by the public key listed in yet another certificate, and so on, until the person relying on the digital signature is adequately assured of its genuineness. At the root level of this chain, a certification authority self-signs its own certificate.

Among other data, the digital certificate usually contains a time stamp or an operational time period to allow the verifier to determine reliably whether the digital signature has expired. To make a public key and its identification with a specific subscriber readily available for use in verification, the certificate may be published in a repository or made available by other means. Repositories are on-line databases of certificates and other information available for retrieval and use in verifying digital signatures. Retrieval can be accomplished automatically by having the verification program directly inquire of the repository to obtain certificates as needed.

Once issued, a certificate may prove to be unreliable, such as in situations where the subscriber misrepresents his identity to the certification authority. In other situations, a certificate may be reliable enough when issued but come to be unreliable sometime thereafter. If the subscriber loses control of the private key, the certificate has become unreliable, and the certification authority (either with or without the subscriber's request depending on the circumstances) may suspend (temporarily invalidate) or revoke (permanently invalidate) the certificate. Immediately upon suspending or revoking a certificate, the certification authority publishes notice of the revocation or suspension or notify persons who inquire or who are known to have received a digital signature verifiable by reference to the unreliable certificate. The revoked certificate is also added to a revocation list maintained by the certification authority.

In the context of intelligent portable devices having embedded processors such as smart cards, even higher security can be obtained by having the smart card itself generate a private/public key combination. This is because the self-generated private key never leaves the card, cannot be viewed and cannot be copied to another card. The private key can only be used by its own smart card for such things as signing, decrypting and encrypting documents. The fact that the private key cannot be copied to another card means that such a highly secure smart card cannot be used for encryption as loss of that one card causes the encrypted data to be unrecoverable.

Therefore, it is desirable to provide a system and method that allows the cryptographic key to be copied from one smart device to another securely and with high assurance.

SUMMARY OF THE INVENTION

According to the principles of the present invention, there is provided a system and method by which a cryptographic key stored in a portable smart device such as a smart card can be copied to another smart card with high security and assurance with the use of a host. Preferably, during the copying process no intermediary is able to see what is being transferred.

According to the invention, the host and a smart source device mutually authenticate themselves with each other. The host and a destination source device also mutually authenticate themselves with each other. Then, the source device authenticates the destination device to ensure that the destination device is permitted to receive the cryptographic key of the source card. The source device then sends the cryptographic key to the destination device.

DETAILED DESCRIPTION OF THE INVENTION

The present invention is a system and method by which a cryptographic key of a portable device having a processor such as a smart card can be copied onto another smart card securely and with high assurance under the control of the issuing organization and potentially a third party notary. Preferably, copying is done without any intermediary being able to see what is being transferred. The present invention also allows a strict control of the number of copies to be made and their allowed uses. As an example, the invention could be used to create a strictly private key for file encryption where the issuing institution would keep or escrow a master card containing the private key in which the private key cannot be viewed and the master card is only used to create a slave smart card. Thus, the key is never exposed, but the loss of the slave card would result in issuance of a new slave card, via the copying method described below, with the same private key as the master smart card.

Figure 3:
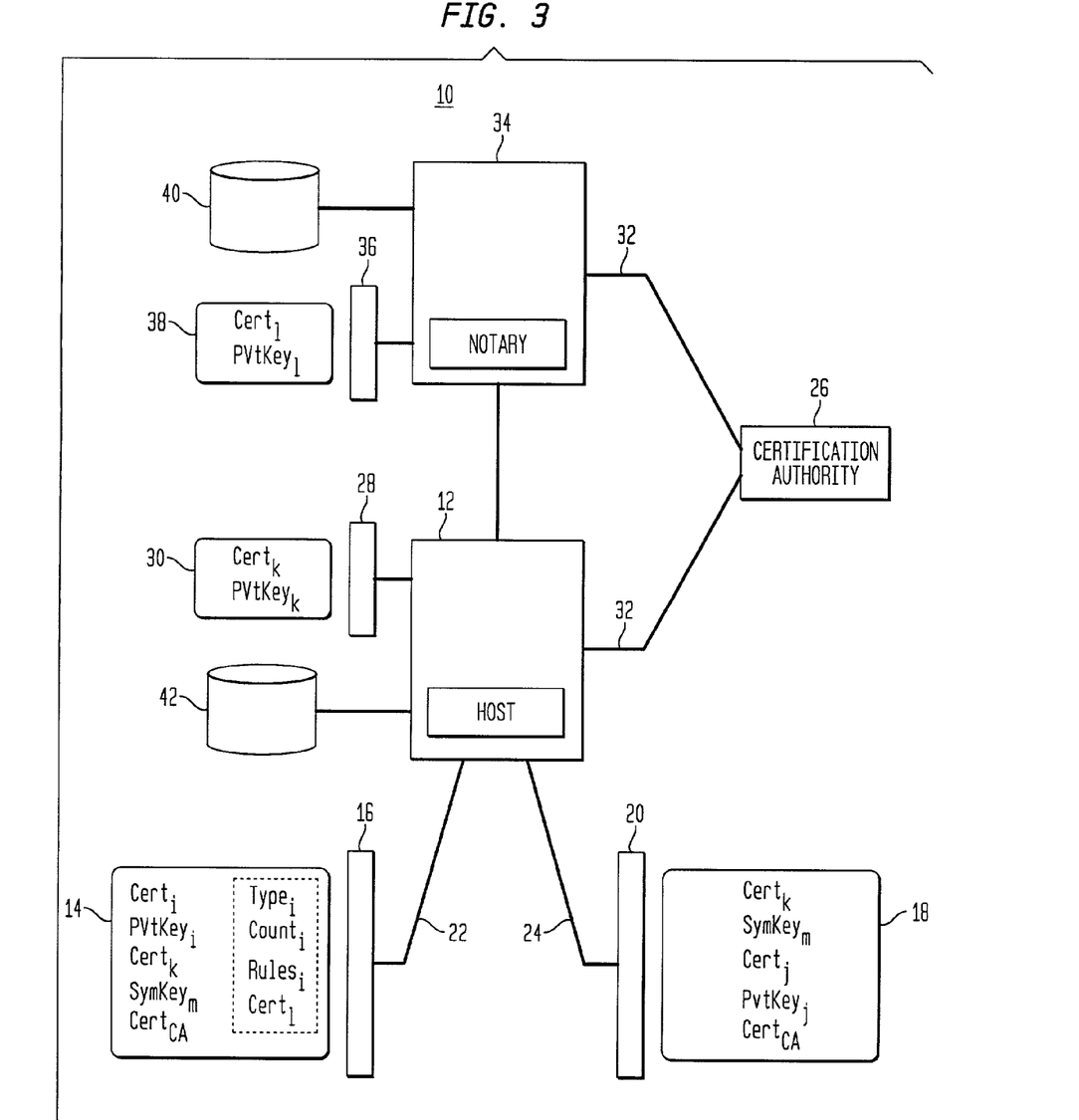
FIG. 3 is a system diagram for securely copying a private key from one smart card to another smart card according to the present invention.

According to the principles of the present invention, FIG. 3 illustrates a diagram of an exemplary system 10 for securely copying a private key from one card to another. The host 12 is the main entity that controls the copying process. A replication database 42 connected to the host 12 stores data related to replication data of smart cards. A host card reader 28 connected to the host 12 is operable to read a host smart card 30. The reader can be a contact-less or contact-based reader. The host card 30 contains a host certificate ($Cert_k$) and a host private key ($PvtKey_k$). Alternatively, although less secure, the host 12 itself can store the host certificate ($Cert_k$) and host private key ($PvtKey_k$). The host certificate ($Cert_k$) contains the public key of the host and is signed with a private key of a certification authority ("certification authority") 26 such as Verisign, Entrust, Department of Defense, or the like while the host private key has been self generated by a processor (not shown) embedded within the host smart card 30.

The system 10 may be connected to a third party notary 34 for additional security. The notary 34 connected to the host 12 has a card reader 36 that is operable to read a notary smart card 38. Similar to the host card 30, the notary smart card 38 contains a notary certificate ($Cert_1$) and a notary private key ($PvtKey_1$). The notary certificate ($Cert_1$) contains the public key of the notary 34 and is signed with a private key of the certification authority 26 while the notary private key has been self generated by a processor (not shown) embedded within the notary card 38. The notary 34 is also connected to a notarization database 40 for storing notary data such as replication approval history and the like.

Both the host 12 and the notary 34 are connected to the certification authority 26. The certification authority 26 issues and validates digital certificates that are used by the host 12, notary 34 and all smart cards 14, 18, 30, and 38 as will be explained in more detail later herein.

A source card reader 16 reads a source smart card 14 and communicates with the host 12 through a link 22. A destination card reader 20 reads a destination smart card 18 and communicates with the host 12 through a link 24. Although not shown, cryptography software is stored in the source card 14, destination card 18, host 12 and host card 30 which operate together to securely copy the private key.

Initially, a manufacturer produces a batch of cards with one card being designated as a master card to be used as the source card 14 and the remaining cards being designated as slave cards to be used as one of the destination cards 18. All cards contain the same symmetric key ($SymKey_m$) that is kept very secure by the manufacturer and is limited to that single batch. Preferably, once the cards have been initialized with the symmetric key, the manufacturer discards the key from its memory to prevent anyone from hacking the key. Further, the manufacturer programs the smart cards such that they do not release their private keys except when they are being copied according to the present invention.

Prior to the copying process, the certification authority 26 issues an instruction for the source smart card 14 to create a random public key/private key ($PvtKey_i$) pair entirely on the smart card itself, using standard primitives or routines. The private key never leaves the smart card, except as described in the copying process below. The certification authority 26 is given the public key by the source card 14. The certification authority 26 then signs it and adds additional information (such as expiration date) to create a standard digital certificate (Cert$_i$), which it returns to the source card 14 for storage. The certification authority 26 also places a copy of the certificate (Cert$_k$) of the host 12 that is allowed to perform a copy of this card, and a certificate of the certification authority 26 that issued the host's certificate, if required.

Depending on the level of security desired and use of the card, other information may be put on the source card 14 such as Type$_i$, Count$_i$, Rules$_i$, Cert$_i$, and Cert$_{CA}$. The Type flag indicates whether the card is a master card which means that it can only be used in the copy process and cannot be used for encrypting or signing. Count indicates how many times the card 14 can be copied. Rules define what the card 14 is allowed to do in scope, time period or the like regarding the process of copying its private key. Cert$_i$ is a notary certificate if notary is used as a secondary check that the host 12 is allowed to copy the card 14. Cert$_{CA}$ is a certificate of the certification authority.

The destination card 18, which already contains the secret symmetric key, is also initialized. It is instructed by the certification authority 26 to create its own public key/private key (PvtKey$_j$) pair and its public key is turned into a signed certificate (Cert$_j$), which the certification authority returns to the destination card 18 for storage. The certification authority 26 also places a copy of the certificate (Cert$_k$) of the host 12, and a certificate (Cert$_{CA}$)of the certification authority 26 that issued the host's certificate, if required.

Figure 4:
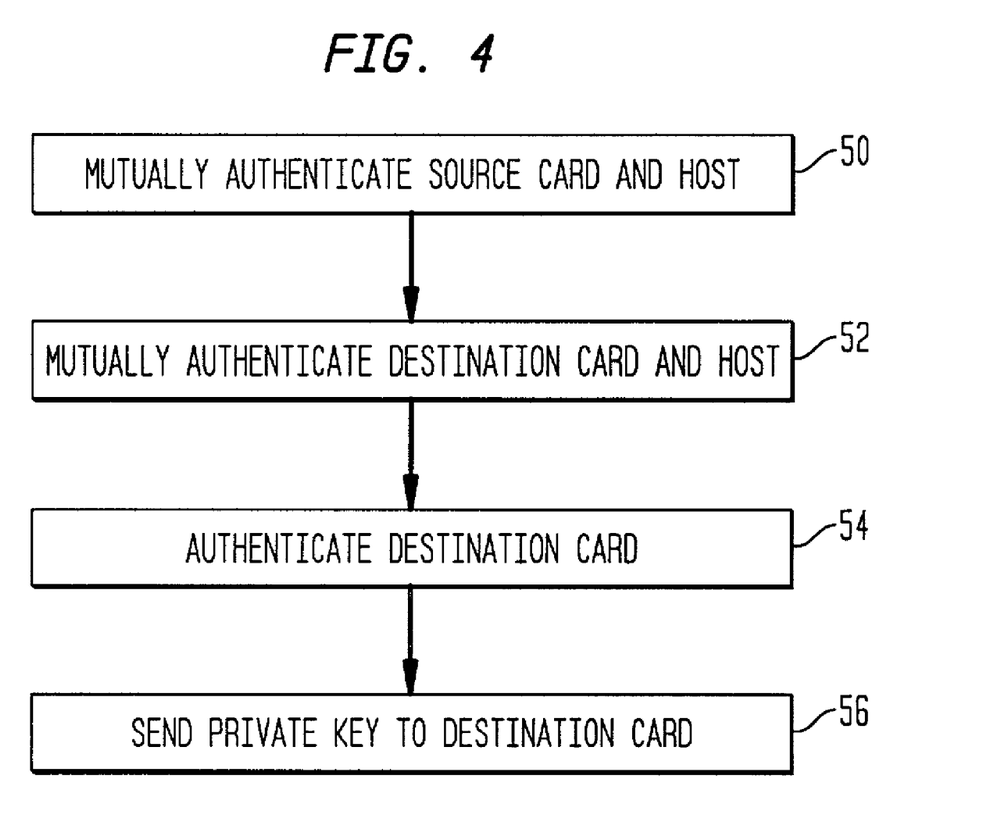
FIG. 4 is a flow diagram of a method for securely copying a private key from one smart card to another card according to the present invention.

FIG. 4 is a flowchart of a process of copying a private key from the source card 14 to the destination card 18. In step 50, the source card 14 and host 12 performs a mutual authentication with each other in a secure manner. In step 52, the destination card 18 and host 12 performs a mutual authentication with each other in a secure manner. In step 54, the source card 14 authenticates the destination card 18 in a secure manner to ensure that the destination card is allowed to receive the private key of the source card 14. Then in step 56, the source card 14 transmits its private key to the destination card 18 in a secure manner through the host 12. A more detailed description of the private key copying process will now be explained with reference to FIGS. 5–7.

Figure 5:
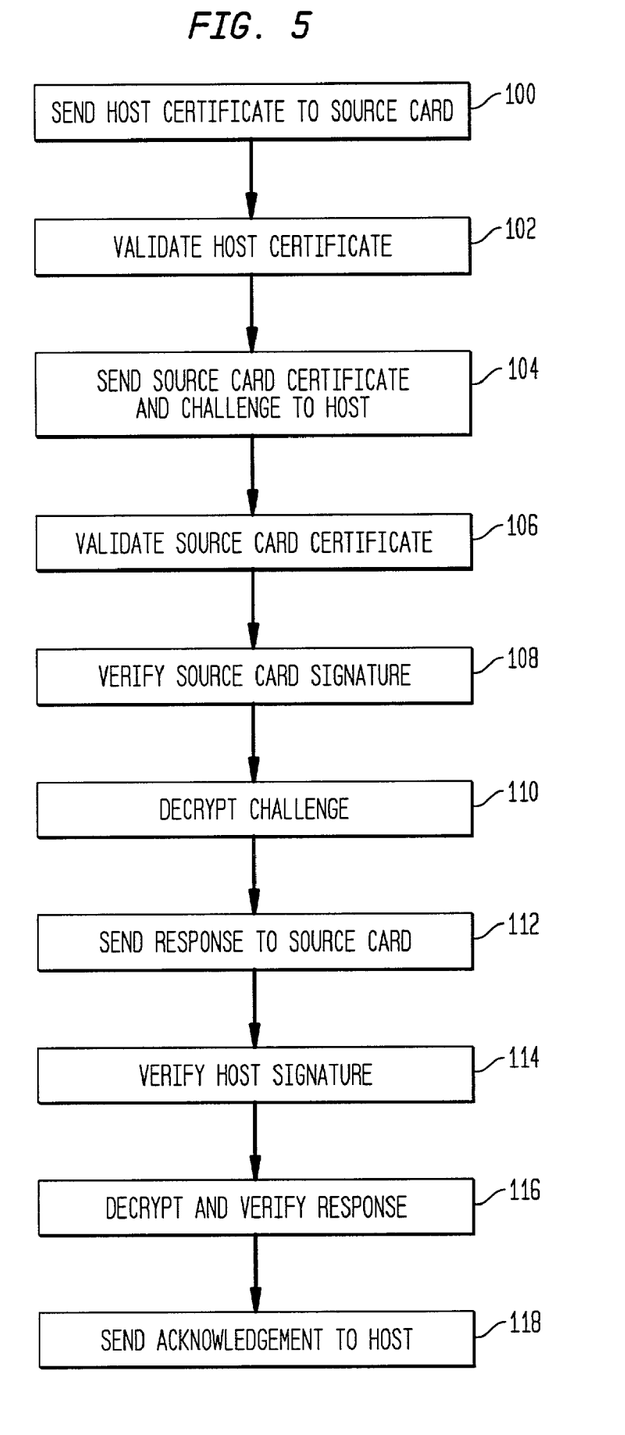
FIG. 5 is a flow diagram for mutually authenticating a host and a source card with respect to each other.

FIG. 5 is a detailed flowchart for the step of mutual authentication between the host 12 and source card 14. At the time of copying, the source and destination cards 14, 18 are inserted into the respective card readers 16, 20 that are attached to the host 12 through the communication links 22, 24. The links 22, 24 can be simple cables or a network such as the Internet or local area network such that the readers 16, 20 can be remotely located. In step 100, the host 12 sends a host certificate which identifies itself as the host. In the embodiment shown, the host certificate contains the public key of the host 12 and is signed by a private key of a certification authority ("CA") such as Verisign, Entrust, Department of Defense, or the like.

In step 102, the source card 14 receives and validates the host certificate. In one embodiment, a copy of the host certificate is already stored in the source card 14 and validating simply involves comparing the received certificate with the stored copy and checking to ensure that the received certificate is not expired. The copy of the host certificate is pre-stored to ensure that only the owner of that certificate can communicate with the source card 14. For added security, the certificate of the certification authority may also be stored in the source card 14, as discussed above with respect to source card initialization, which can then be used to authenticate the host public key contained in the certificate as part of the validation process. Alternatively, the source card 14 can validate the host certificate by communicating with the certification authority that issued the host certificate and ensuring that the public key in the certificate corresponds to the host 12. As part of the validation process, other checks can be made such as checking the revocation list (CRL) maintained by the certification authority through the host 12. Such a check ensures that the private key of the host 12 has not been compromised.

Once the received certificate has been validated, the source card 14 in step 104 responds to the host 12 by sending its own certificate and a challenge. The certificate contains the source card's public key and has been signed by the certification authority. The smart card produces the challenge by generating a random number, encrypting the number with the host public key and signing the encrypted number with the source card's private key. The signature proves to the host 12 that the source card 14 has its private key.

In step 106, the host 12 receives and validates the source card certificate by communicating with the certification authority. If validated, the host 12 stores the source card's certificate. Then in step 108, the host 12 verifies the source card's signature in the received challenge by using the public key from the source card's certificate. If the signature is verified, the host 12 knows that the source card 14 has the private key associated with the challenge. In step 110, the host 12 then retrieves the original random number by decrypting the challenge with the private key of the host.

Once the challenge is decrypted, the host 12 in step 112 prepares and sends a response to the source card 14. The response is produced by encrypting the retrieved random number with the source card's public key and signing the encrypted number with the host's private key.

In step 114, the source card 14 receives the response and verifies the host signature in the response by using the public key in the stored host certificate. If the signature is verified, the source card 14 knows that the host 12 has its private key and that the host 12 signed the response with that private key. Then in step 116, the source card 14 retrieves the original random number by decrypting the response with the private key of the source card. Then the retrieved random number is verified against the originally generated number to ensure that they are the same.

At step 118, the source card 14 prepares and sends an acknowledgement message that is signed with the source card's private key which signature is then verified by the host 12. At this stage, the source card 14 and the host 12 have been mutually authenticated, that is they have each verified that the other entity is who it is claimed to be.

At this point, a secondary authentication may be performed between the source card 14 and the notary 34. The notary 34 is a secondary host, generally kept off-line, on a remote site, and run by a different organization. If the source card 14 was issued with the notary certificate, it will require that the notary 34 be put on-line, and a second authentication between the source card 14 and notary 34 be performed. This prevents a single malicious user with access to the original host from copying the source card 14, because the user must convince the organization that hosts the notary 34 that copying of the key can proceed. The secondary authentication steps are identical to the mutual authentication steps 100 to 118 of FIG. 5 except that there is a new random challenge generated and encrypted with the notary's public key and that any communication between the notary 34 and the source card 14 passes through the host and the host signs it each way.

In short, the source card 14 creates a new challenge, encrypts it with the notary's public key, signs it with its private key and sends it along with the source card certificate to the notary 34 via the host 12 who also signs it. The notary 34 verifies both signatures, decrypts the challenge and re-encrypts it as a notary response to the challenge using the source card's public key from the source card certificate. The notary 34 then signs the notary response and sends it back to the source card 14 via the host 12 who also signs it. The source card verifies both signatures and decrypts and verifies the notary challenge, thus proving that the notary is on-line and has access to its private key.

Figure 6:
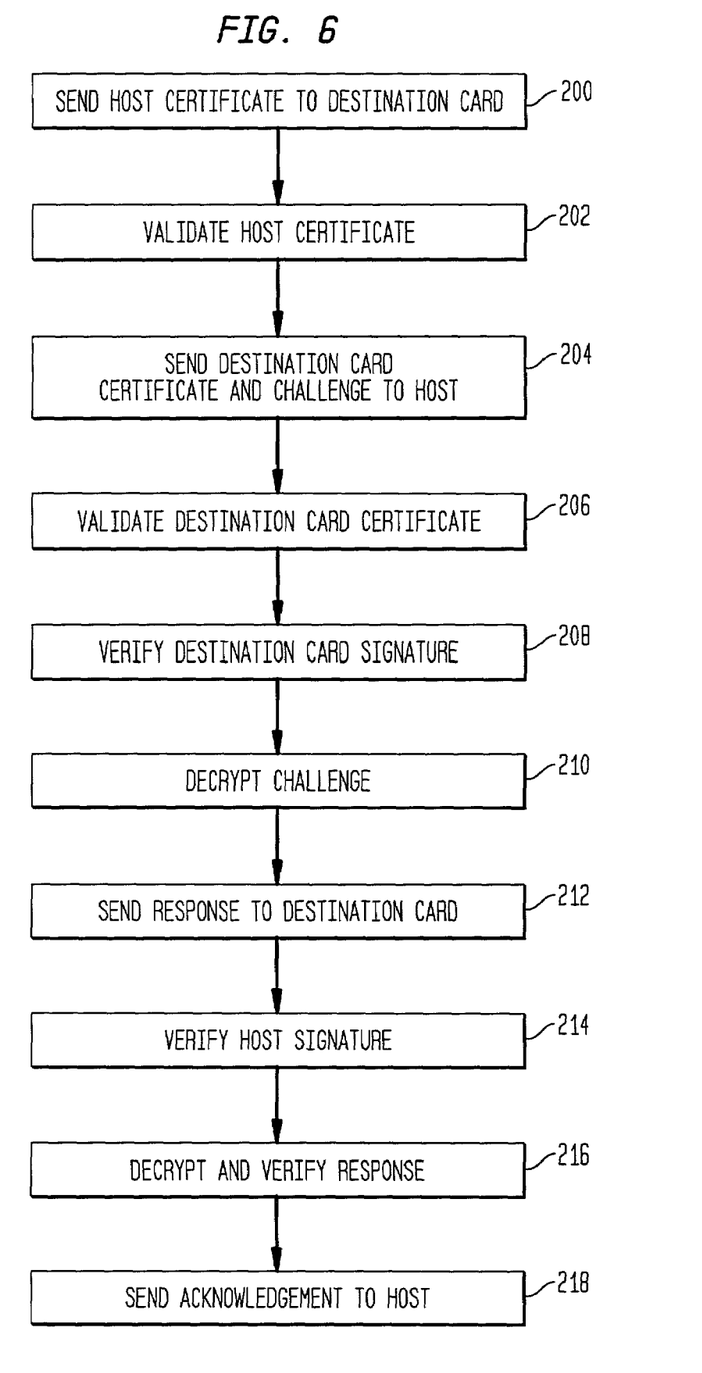
FIG. 6 is a flow diagram for mutually authenticating the host and a destination card with respect to each other.

FIG. 6 is a detailed flowchart for the step of mutual authentication between the host 12 and destination card 18. The same steps in FIG. 5 are repeated except that they are between the host 12 and destination card 18. Specifically, in step 200, the host 12 sends a host certificate which identifies itself as the host to the destination card 18. In the embodiment shown, the host certificate contains the public key of the host 12 and is signed by the certification authority.

In step 202, the destination card 18 receives and validates the host certificate. In one embodiment, a copy of the host certificate is already stored in the destination card 18 and validating simply involves comparing the received certificate with the stored copy and checking to ensure that the received certificate is not expired. The copy of the host certificate is pre-stored to ensure that only the owner of that certificate can communicate with the destination card 18. For added security, the certificate of the certification authority may also be stored in the destination card 18, as discussed above with respect to destination card initialization, which can then be used to authenticate the host public key contained in the certificate as part of the validation process. Alternatively, the destination card 18 can validate the host certificate by communicating with the certification authority that issued the host certificate and ensuring that the public key in the certificate corresponds to the host 12. As part of the validation process, other checks can be made such as checking the revocation list (CRL) maintained by the certification authority through the host 12. Such a check ensures that the private key of the host 12 has not been compromised.

Once the received certificate has been validated, the destination card 18 in step 204 responds to the host 12 by sending its own certificate and a challenge. The certificate contains the destination card's public key and has been signed by the certification authority. The smart card produces the challenge by generating a random number, encrypting the number with the host public key and signing the encrypted number with the destination card's private key. The signature proves to the host 12 that the destination card 18 has its private key.

In step 206, the host 12 receives and validates the destination card certificate by communicating with the certification authority. If validated, the host 12 stores the destination card's certificate. Then in step 208, the host 12 verifies the destination card's signature in the received challenge by using the public key from the destination card's certificate. If the signature is verified, the host 12 knows that the destination card 18 has the private key associated with the challenge. In step 210, the host 12 then retrieves the original random number by decrypting the challenge with the private key of the host.

Once the challenge is decrypted, the host 12 in step 212 prepares and sends a response to the destination card 18. The response is produced by encrypting the retrieved random number with the destination card's public key and signing the encrypted number with the host's private key.

In step 214, the destination card 18 receives the response and verifies the host signature in the response by using the public key in the stored host certificate. If the signature is verified, the destination card 18 knows that the host 12 has its private key and that the host 12 signed the response with that private key. Then in step 216, the destination card 18 retrieves the original random number by decrypting the response with the private key of the destination card. Then the retrieved random number is verified against the originally generated number to ensure that they are the same.

At step 218, the destination card 18 prepares and sends an acknowledgement message that is signed with the destination card's private key which signature is then verified by the host 12. At this stage, the destination card 18 and the host 12 have been mutually authenticated, that is they have each verified that the other entity is who it is claimed to be.

Figure 7:
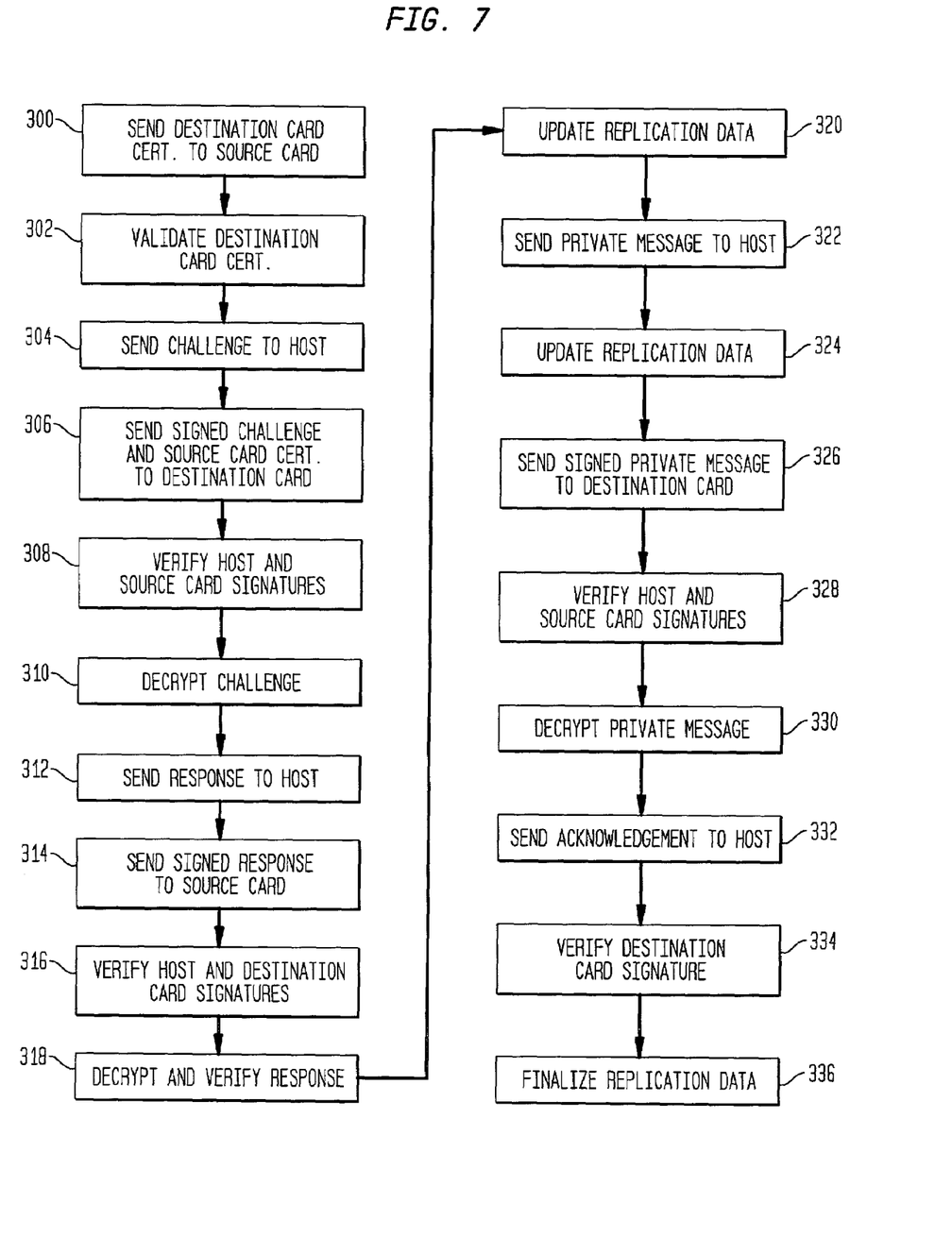
FIG. 7 is a flow diagram for authenticating the destination card by the source card.

At this stage, the host 12 has authenticated the identity of both the source and destination cards 14, 18, and both cards have authenticated the identity of the host. The next step is for the source card 14 to authenticate the destination card 18 to ensure that the data to be transferred from the source card 14 is going to the correct party. In the embodiment of FIG. 7, authentication of the destination card 18 involves proving to the source card 14 that the destination card 18 has the same secret symmetric key as the source card, which proves that the destination card has been manufactured in the same batch as the source card.

In step 300, the host 12 sends a destination card 18 certificate to the source card 14. The certificate contains the public key of the destination card 18 and is signed by the certification authority.

In step 302, the source card 14 validates the received certificate through the certification authority to ensure that the private key of the destination card 18 has not been compromised. In step 304, the source card 14 responds to the host 12 by sending a challenge message that is intended for the destination card 18. The challenge is produced by generating a random number, encrypting the number with the public key of the destination card 18, further encrypting the encrypted number with the symmetric key, and signing the message with the private key of the source card 14 to indicate that the challenge is from the source card 14.

In step 306, the host 12 receives the challenge, signs it with its private key and send the signed challenge along with the source card certificate to the destination card 18.

In step 308, the destination card 18 verifies the signature of the host 12 using the stored public key of the host and verifies the source card's signature using the public key contained in the received source card certificate. In step 310, the destination card 18 unscrambles the received challenge in the opposite order it was scrambled in step 304. That is, the destination card 18 decrypts the challenge using the symmetric key and then decrypting it further with its own private key.

In step 312, the destination card 18 responds to the host 12 by sending a response that is intended for the source card 14. The response is produced by encrypting the original random number in the challenge with the public key of the source card 14, further encrypting the encrypted number with the symmetric key, and signing the message with the private key of the destination card 18 to indicate that the response is from the destination card.

In step 314, the host 12 receives the response, signs it with its private key and sends the signed response to the source card 14. In step 316, the source card 14 receives the signed response from the host 12. Then the signatures of the host 12 and destination card 18 in the received response are verified by the source card 14 using the public keys of the host 12 and the destination card stored in the source card.

In step 318, the source card 14 unscrambles the received response in the opposite order it was scrambled in step 312. The source card 14 decrypts the challenge first with the symmetric key and then with its private key. The source card 14 then verifies that the response contains the same random number that it sent to the host 12 in step 304.

At this stage, the destination card 18 is authenticated. The source card 14 knows that the destination card 18 has the same symmetric number as the source card since the destination card was able to decrypt and re-encrypt the challenge. This means that it is safe to send the private key of the source card 14 to the destination card 18.

In step 320, the source card 14 updates its replication data such as decreasing the count by one to reflect that its private key is about to be transferred to the destination card 18 through the host 12. Depending on the type of application of the present invention, other data that are tracked may be updated. For example, the source card 14 may store the unique identification number of the destination card 18 to track which cards have copied the private key.

In step 322, the source card 14 prepares a private message to be sent to the host 12 for forwarding to the destination card 18. The private message contains the private key data of the source card 14 and other relevant data that the destination card 18 may need such as the rules and the notary's certificate. The private message is then generated by encrypting the data with the symmetric key, further encrypting the data with the public key of the destination card 18 and signing the message with the private key of the source card 14. The private message is then forwarded to the host 12.

The private message is encrypted with the destination card's public key because there may be other cards that may contain the same symmetric key as the source card 14. If the private message is encrypted with only the symmetric key, it may be possible for a third party to intercept the message and copy the private key to another card. By encrypting the message further with the destination card's public key, the source card 14 is ensuring that only the authenticated destination card 18 can properly decrypt the private message.

In step 324, the host 12 receives the private message from the source card 14 and updates its replication database. In step 326, the host 12 signs the private message with its private key and send the signed private message to the destination card 18.

In step 328, the destination card 18 verifies the signatures of the host 12 and source card 14 contained in the signed private message by using their public keys stored in the card.

In step 330, the destination card 18 unscrambles the signed private message in the opposite order it was scrambled in step 322. The destination card 18 decrypts the private message using its private key, then its symmetric key m. The private key of the source card 14 and other data contained in the private message are then stored accordingly in the destination card 18. Other actions may be taken by the destination card 18 at this point, such as setting its flag to a different type than the source card 14, such as to denote itself as a "daughter" card capable of encryption and signing rather than as a "master". It may also render itself incapable of being copied as described in this process. The details of these actions are dependent on the needs of the organization using the protocol.

In step 332, the destination card 18 acknowledges copying of the data containing the source card's private key by sending an acknowledgment message such as "Key Copied" that is signed with the destination card's private key.

In step 334, the host 12 receives the acknowledgment and verifies the signature using the stored public key of the destination card 18. If verified, the host 12 in step 336 finalizes the update of the replication database to indicate that the private key has been successfully copied by the destination card 18.

From the foregoing, it will be appreciated that, although specific embodiments of the invention have been described herein for purposes of illustration, various modifications may be made without deviating from the spirit and scope of the invention. For example, while the secure copying process has been described using only smart cards, the principles of the invention applies to any device of any shape such as a smart device that fits on a key chain. Further, while the exemplary embodiment shows the smart cards themselves performing all encryption, decryption and signature functions through their embedded processors, it will be appreciated that some or all of such functions can be done by other processors such as those present in the card readers although such use of external processors may be less secure than the exemplary embodiment. Accordingly, the present invention is not limited except as by the appended claims.

What is claimed is:

1. A method of securely copying a cryptographic key from one smart device to another smart device, comprising:
   mutually authenticating a smart source device and a host with respect to each other;
   mutually authenticating a smart destination device and the host with respect to each other;
   authenticating the destination device through the host by the source device; and
   sending a cryptographic key stored in the source device to the destination device,
   wherein the step of authenticating the destination device includes
   sending to the destination device a challenge encrypted with a symmetric key and signed with a private key of the source device, the symmetric key being common to the source and destination devices,
   decrypting the challenge with the symmetric key by the destination device,
   verifying the signature of the challenge by the destination device,
   sending to the source device a response encrypted with the public key of the source device and signed with the private key of the destination device,
   verifying the signature of the response by the source device, and
   decrypting the response with the private key of the source device,
   wherein the step of sending to the destination device a challenge includes
   sending the challenge to the host,
   signing the challenge with the private key of the host, and
   sending the signed challenge to the destination device.

2. The method according to claim 1, prior to the step of sending a cryptographic key, further comprising mutually authenticating the smart source device and a notary with respect to each other.

3. The method according to claim 1, wherein the step of mutually authenticating a smart source device and a host comprises:
- sending to the host a challenge signed with the private key of the source device;
- verifying the signature of the challenge by the host;
- sending to the source device a response signed with the private key of the host; and
- verifying the signature of the response by the source device.

4. The method according to claim 1, wherein the step of mutually authenticating a smart source device and a host comprises:
- sending, to the host, a challenge encrypted with the public key of the host and signed with the private key of the source device;
- verifying the signature of the challenge by the host;
- decrypting the challenge with the private key of the host;
- sending, to the source device, a response encrypted with the public key of the source device and signed with the private key of the host;
- verifying the signature of the response by the source device; and
- decrypting the response with the private key of the source device.

5. The method according to claim 4 wherein:
the step of sending, to the host, a challenge includes:
generating a random number by the source device;
encrypting the random number with the public key of the host; and
signing the random number with the private key of the source device; and
the step of sending, to the source device, a response includes:
encrypting the random number with the public key of the source device; and
signing the random number with the private key of the host.

6. The method according to claim 1, wherein:
the step of mutually authenticating a smart source device and a host includes:
- sending to the host a challenge signed with the private key of the source device;
- verifying the signature of the challenge by the host;
- sending to the source device a response signed with the private key of the host; and
- verifying the signature of the response by the source device; and the step of authenticating the destination device includes:
- sending to the destination device a challenge signed with a private key of the source device;
- verifying the signature of the challenge by the destination device;
- sending to the source device a response signed with the private key of the destination device; and
- verifying the signature of the response by the source device.

7. The method according to claim 1, wherein the step of sending to the source device a response includes:
- encrypting the decrypted challenge with the public key of the source device;
- encrypting the decrypted challenge with the symmetric key; and
- signing the decrypted challenge with the private key of the destination device.

8. The method according to claim 1, wherein the step of sending to the destination device a challenge includes:
- generating a random number;
- encrypting the random number with the public key of the destination device;
- encrypting the random number with the symmetric key; and
- signing the random number with the private key of the source device.

* * * * *